(12) United States Patent
Oh et al.

(10) Patent No.: US 7,428,283 B2
(45) Date of Patent: Sep. 23, 2008

(54) DATA RECOVERY ALGORITHM USING DATA POSITION DETECTION AND SERIAL DATA RECEIVER ADOPTING THE SAME

(75) Inventors: Je-Hoon Oh, Seoul (KR); Chul-Ho Lim, Seoul (KR)

(73) Assignee: Ed-Tech Co., Ltd., Seoul (KR)

( * ) Notice: Subject to any disclaimer, the term of this patent is extended or adjusted under 35 U.S.C. 154(b) by 675 days.

(21) Appl. No.: 10/884,358

(22) Filed: Jul. 2, 2004

(65) Prior Publication Data

US 2005/0047539 A1 Mar. 3, 2005

(30) Foreign Application Priority Data

Aug. 29, 2003 (KR) ...................... 10-2003-0060227

(51) Int. Cl.
*H04L 27/06* (2006.01)
*H03M 13/00* (2006.01)

(52) U.S. Cl. ...................... 375/355; 714/798
(58) Field of Classification Search ................ 375/355
See application file for complete search history.

(56) References Cited

U.S. PATENT DOCUMENTS

| 4,811,325 | A | * | 3/1989 | Sharples et al. | ............... 369/85 |
| 2003/0002608 | A1 | * | 1/2003 | Glenn et al. | ................ 375/371 |
| 2003/0061564 | A1 | * | 3/2003 | Maddux | ..................... 714/798 |
| 2006/0023827 | A1 | * | 2/2006 | Sanders et al. | .............. 375/376 |

* cited by examiner

*Primary Examiner*—Dac V. Ha
(74) *Attorney, Agent, or Firm*—Cooper & Dunham LLP

(57) ABSTRACT

The present invention relates generally to a data recovery algorithm and a serial link data receiver adopting the same. The data recovery algorithm includes receiving a serial data stream and a reference clock signal from a transmitting end, generating a plurality of overclock signals based on the received reference clock signal, oversampling the received serial data based on the plurality of overclock signals, and comparing values sampled by the respective overclock signals and outputting the most effective value as a data value that corresponds to the reference clock signal while considering a transition position of a data bit.

3 Claims, 3 Drawing Sheets

DATA RECOVERY ALGORITHM USING DATA POSITION DETECTION AND SERIAL DATA RECEIVER ADOPTING THE SAME

BACKGROUND OF THE INVENTION

1. Field of the Invention

The present invention relates generally to a data recovery algorithm and a serial link data receiver adopting the same and, more particularly, to an algorithm, which enables a data receiving end for receiving data serially transmitted by a data transmitting end and recovering the data to stably recover data without loss even though seriously distorted data that deviates from the valid window of the data by 50% due to the generations of data skew (i.e., a phenomenon in which a difference occurs in the time that respective bits take to arrive at a termination device. Mainly, the phenomenon occurs due to the difference between the lengths of cables or board lines) and transformation is received, and a serial data receiver adopting the algorithm.

2. Description of the Related Art

Generally, in data transceiving between two devices mounted on a circuit board or digital transceiving between communication devices spaced far apart from each other, when data is serially transmitted and received, there are many advantages in that the compression of the data is easy, the number of device pins can be reduced, a circuit board can be simplified and a signal interference possibly occurring between parallel signals can be prevented, so that a method of serially transceiving digital data has been applied to various systems. Generally, chips referred to as a serial link are operated with a transmitting end and a receiving end forming a pair, and the two chips are connected to each other by a transmission cable. Meanwhile, serial link-series chips that are frequently used for image signal transmission, such as a Low Voltage Differential Swing (LVDS) transceiving chip or a Transition Minimized Differential Signaling (TMDS) transceiving chip, are characterized in that the data transmission and clock transmission between the transceiving chips are performed through different channels. Generally, for data output from a transmission chip, even though the data is synchronized with a clock at the time of output, the skew between the data and the clock may be generated when the data arrives at a receiving end due to various reasons, and further a serious data distortion phenomenon, such as the transformation of a data valid window, may occur. In this case, the pattern of the data is not input in an ideal condition in which the recovery is easy, so that a receiving end chip must be provided with characteristics capable of recovering the data to a normal state in all cases, and a recovery algorithm.

FIG. 3 is a view showing one of conventional circuits for adjusting the above data skew. According to the circuit, when transition exists between adjacent data, the data is recovered in such a way as to detect the edge of the data, compare the positions of the data edge and a reference edge, and adjust the data to be delayed based on the difference between the positions.

With reference to the construction of FIG. 3, the data recovery is described in detail below. First, serial data and a clock signal output from a transmitting end are input to the input buffer 31 and clock buffer 35 of the receiving end 30, respectively, through a data bus or a cable. A clock generator 37 generates a transition clock signal and a central clock signal based on the input clock, and supplies the transition clock signal and the central clock signal to a data sampler 33. Thereafter, the data sampler 33 continuously samples the transition position between two adjacent serial data bits in response to the clock, samples the accurate center position of each data bit, and transmits a result value to an edge comparator 34. The edge comparator 34 compares the sampled value with an ideal logic critical value. If there exists a difference therebetween, it is determined that data skew is generated. In this case, the comparator 34 determines the extent of the data skew according to the magnitude of the difference, generates a skew control signal, and transmits the skew control signal to a data delay cell 32. The data delay cell 32 delays the data in response to the skew control signal to carry out adjustment so that a reference clock is accurately located at the center position of each serial data bit.

There are three major problems in the conventional method. First, since the conventional method is constructed to detect skew existing on current data intended to be recovered and adjust the skew of next input data, there is no way to adjust a data recovery error caused by the skew of the current data. Second, in the case where the data is transformed by skew and transformation by 50% or more, that is, the phase of the data is changed by ½ of a cycle or more, it is difficult to accurately recover data because the extent of the skew cannot be accurately detected. Furthermore, since relatively many additional circuits are required to implement the conventional method, it is problematic in that power consumption increases and the size of a chip increases.

SUMMARY OF THE INVENTION

Accordingly, the present invention has been made keeping in mind the above problems occurring in the prior art, and an object of the present invention is to provide a data recovery algorithm using data position information detection, which can stably and accurately recover data even though seriously distorted data, which deviates from the valid window of the data by 50% or more because the skew and transformation of the data occur, is generated when a serial data stream is received.

Another object of the present invention is to provide an algorithm that can accurately recover even an initial input data without an error.

Still another object of the present invention is to provide a serial data receiver that can be simply implemented by adopting the data recovery algorithm.

In order to accomplish the above object, the present invention provides a data recovery algorithm using position information detection, including receiving a serial data stream and a reference clock signal from a transmitting end, generating a plurality of overclock signals based on the received reference clock signal, oversampling the received serial data based on the plurality of overclock signals, and comparing values sampled by the respective overclock signals and outputting the most effective value as a data value that corresponds to the reference clock signal while considering a transition position of a data bit.

In order to accomplish the above object, the present invention provides a serial data receiver, including an input buffer for receiving and storing a serial data signal output from a transmitting end, a clock buffer for receiving and storing a reference clock signal output from the transmitting end, a clock generator for generating a plurality of overclock signals based on the reference clock signal, a data sampler for oversampling the received serial data based on the plurality of overclock signals, and a position detector for comparing values sampled by the respective overclock signals and outputting the most effective value as a data value that corresponds to the reference clock signal while considering a transition position of a data bit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
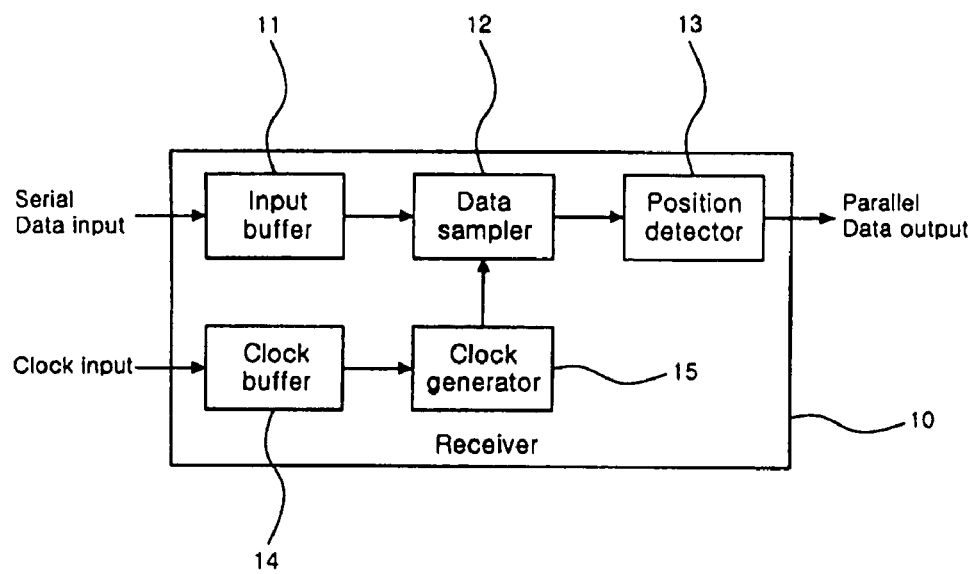
FIG. 1 is a block diagram showing the construction of a receiver adopting a recovery algorithm in accordance with the present invention.
Figure 2:
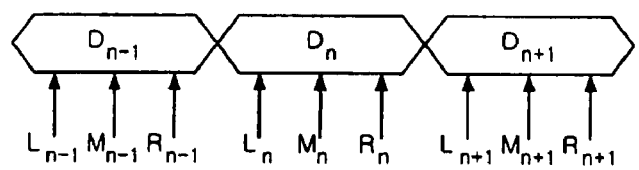
FIG. 2 is a view showing the pattern of data and oversampling clocks used for the recovery algorithm of the present invention.
Figure 3:
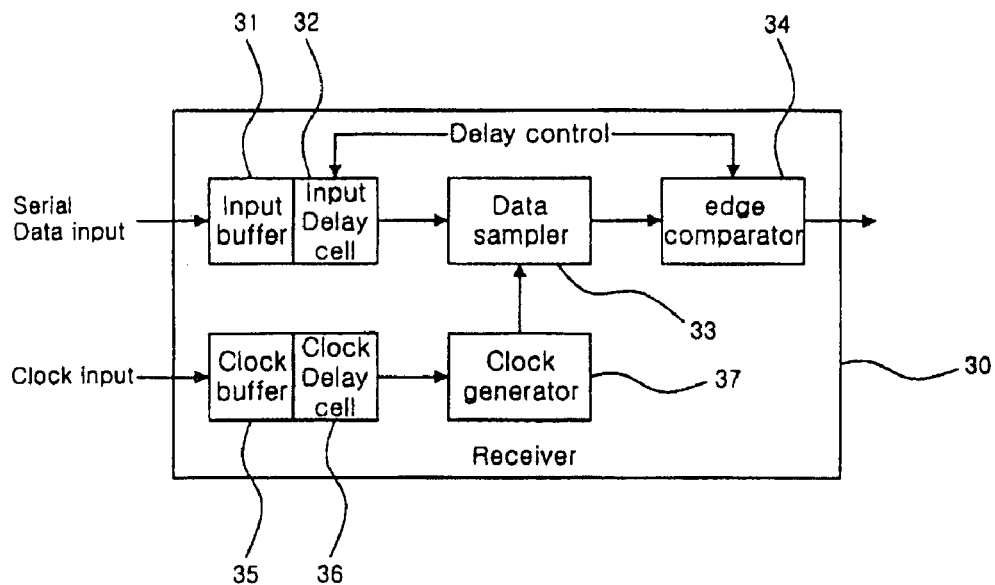
FIG. 3 is a block diagram showing the construction of a conventional receiver.
Figure 4:
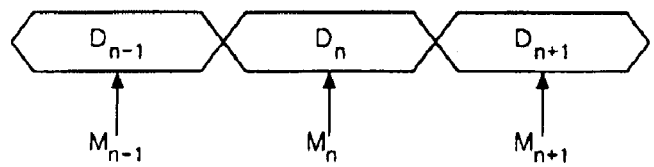
FIG. 4 is a view showing the pattern of data and oversampling clocks used for a conventional recovery algorithm.

Reference now should be made to the drawings, in which the same reference numerals are used throughout the different drawings to designate the same or similar components.

The characteristic construction and operation of the present invention are described with reference to the attached drawings in detail below.

Figure 5:
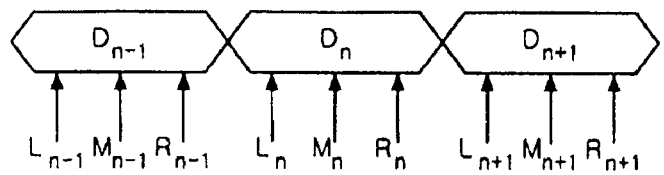
FIG. 5 is a view showing the normal pattern of input data and sampling clocks.

Generally, an oversampling algorithm is frequently used to stably recover serial data. When the oversampling algorithm is used, data can be recovered without problems in the case where the pattern of input data and sampling clocks are in a normal state, as shown in FIG. 5. In this case, $D_{n-1}$, $D_n$ and $D_{n+1}$ indicate successive data bit strings, respectively, and $L_n$, $M_n$ and $R_n$ indicate the oversampling clocks of an n-th data bit string, respectively. In the case of the normal data and oversampling clocks, if oversampling is performed on the data $D_n$ intended to be recovered using the oversampling clocks $L_n$, $M_n$ and $R_n$, $D_n$s are achieved as outputs. That is, the following result can be achieved.

$$\text{Out}(L_n) = \text{Out}(M_n) = \text{Out}(R_n)$$

In this case, since every output has a correct value, effective data recovery can be achieved even though any one is output.

Figure 6:
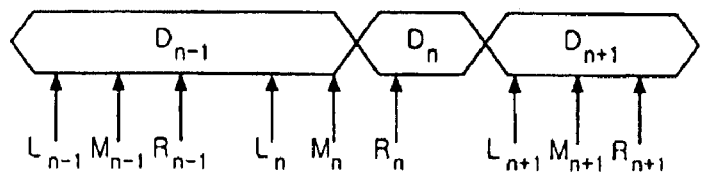
FIGS. 6 to 7d are views showing the patterns of the input data and sampling clocks in which skew and distortion have been generated.

Meanwhile, referring to FIG. 6 showing an input pattern and oversampling clocks in which skew and distortion have been generated, it can be understood that skew, which generally has moved to the right with respect to the sampling clocks, is generated compared to FIG. 5 showing the normal input state. The pattern shown in FIG. 6 is described in detail below. The eye window of data $D_{n-1}$ (i.e., the pattern of a valid window in which data can be accurately recovered) is broadened, while the eye window of data $D_n$ is considerably narrowed. In the case of the data $D_{n-1}$, the eye window is distorted but the eye window is broadened, so that there is no problem in recovering the data. The reason for this is because the oversampling clocks $L_n$, $M_n$ and $R_n$ are within the valid window of the data $D_{n-1}$. However, in the case of the data $D_n$, a distortion phenomenon occurs, in which the eye window is narrowed, so that only the oversampling clock $R_n$ is within the eye window of the data $D_n$ but other oversampling clocks $L_n$ and $M_n$ are within the valid window of the data $D_{n-1}$. Accordingly, it is considerably difficult to recover the data even though the oversampling algorithm is used. When the oversampling algorithm is used in a normal case, the recovery capability of data can be increased by sampling the single data a number of times. However, in the case of recovering data, such as the seriously distorted data $D_n$, the oversampling clocks $L_n$ and $M_n$ sample the data $D_{n-1}$, but only the oversampling clock $R_n$ samples the data $D_n$, so that the data $D_{n-1}$ sampled by two of three oversampling clocks is recovered to data corresponding to the normal data $D_n$, and $D_n$ sampled by the oversampling clock $R_n$ is processed to be incorrect data.

The present invention enables the data sampled by the oversampling clock $R_n$ to be detected as the normal data even in the above case. The data position detection algorithm of the present invention can accurately detect a position where the valid window is located even in the case of the distorted data, and stably recover the data.

The principle of the data position detection algorithm of the present invention capable of accurately recovering data is described in detail below. In the case where there is the distortion of data as shown in FIG. 6, if oversampling is performed using clocks $L_n$, $M_n$ and $R_n$, the results in which $\text{Out}(L_n) = D_{n-1}$ and $\text{Out}(R_n) = D_n$ are obtained, so that $\text{Out}(L_n) \ne \text{Out}(R_n)$. In this case, it cannot be directly understood which of $\text{Out}(L_n)$ and $\text{Out}(R_n)$ is an effective value, but only that the distortion of the data is generated by the influence and skew of adjacent data $D_{n-1}$ and $D_{n+1}$. That is, the stable recovery of data cannot be performed using only the sampling of the data $D_n$, but it is required to consider relationships with the adjacent data. An algorithm of the present invention capable of meeting this condition is described below.

First, the case where $\text{Out}(L_n) = \text{Out}(R_n)$ is described. Even in the case where output values sampled by sampling clocks $L_n$ and $R_n$ are identical with each other, it cannot be concluded that there is no distortion of data. Accordingly, in this case, the algorithm of the present invention determines that there is no distortion of the data only when the transition of the data exists at least one locations between the clocks $L_n$ and $M_{n-1}$, or between the clocks $R_n$ and $M_{n+1}$, as understood from FIG. 5. Accordingly, if there is the transition of the data, any of $\text{Out}(L_n)$ and $\text{Out}(R_n)$ can be output as an effective output. In contrast, if there is no transition of the data between the clocks $L_n$ and $M_{n-1}$, and between the clocks $R_n$ and $M_{n+1}$, the most effective data is $\text{Out}(M_n)$, so that $\text{Out}(M_n)$ is selected as an effective output. For example, if it is assumed that $D_{n-1} = 1$, $D_n = 0$ and $D_{n+1} = 1$, $\text{Out}(L_n) = \text{Out}(R_n)$ is satisfied, but the distortion of the data is generated. In this case, no transition of the data exists between the clocks $L_n$ and $M_{n-1}$, and between the clocks $R_n$ and $M_{n+1}$, so that $\text{Out}(M_n)$ is selected as an effective output.

Next, the case where $\text{Out}(L_n) \ne \text{Out}(R_n)$ is described. This case must include the distortion of data. In this case, the algorithm of the present invention detects the position of data transition, and determines that $\text{Out}(R_n)$ is an effective output if the data transition exists only between the clocks $R_n$ and $M_{n+1}$. For example, if it is assumed that $D_{n-1} = 1$, $D_n = 0$ and $D_{n+1} = 1$ in FIG. 7b, $\text{Out}(L_n) \ne \text{Out}(R_n)$ is satisfied and the data transition exists only between the clocks $R_n$ and $M_{n+1}$, so that $\text{Out}(R_n)$ is selected as an effective output. In contrast, if the data transition exists only between the clocks $L_n$ and $M_{n-1}$, it is determined that the $\text{Out}(L_n)$ is an effective output. For example, if it is assumed that $D_{n-1} = 1$, $D_n = 0$ and $D_{n+1} = 1$, $\text{Out}(L_n) \ne \text{Out}(R_n)$ is satisfied and the data transition exists only between the clocks $L_n$ and $M_{n-1}$, so that $\text{Out}(L_n)$ is selected as an effective output. If there is no transition of the data between the clocks $R_n$ and $M_{n+1}$, and between the clocks $L_n$ and $M_{n-1}$, it is determined that $\text{Out}(M_n)$ is an effective output value for the recover of the data. For example, if it is assumed that $D_{n-1}=0$, $D_n=0$ and $D_{n+1}=1$, $Out(L_n)!=Out(R_n)$ is satisfied and there is no data transition between the clocks $R_n$ and $M_{n+1}$, and between the clocks $L_n$ and $M_{n-1}$, so that $Out(M_n)$ is selected as an effective output.

By applying the algorithm of the present invention, the recovery of all data patterns transformed not to deviate from the sampling limitation of a minimum clock $L_n$ and a maximum clock $R_n$ can be achieved even in the cases except for the above-described case. If the frequency of the oversampling clock is three times the frequency of a reference clock as described in the above example, the data transformed within 75% can be accurately recovered. However, the frequency of the oversampling clock can be further increased depending on embodiments, in which case, data can be more accurately recovered.

With reference to FIG. 1, the construction and operation of a serial data receiver adapted to implement the above algorithm are described below. As shown in FIG. 1, a serial data receiver 10 of the present invention includes an input buffer 11, a clock buffer 14, a clock generator 15, a data sampler 12, and a position detector 13. A serial data signal and a reference clock signal output from a transmitting end is received by and stored in the input buffer 11 and the clock buffer 14, respectively. The clock generator 15 receiving the reference clock signal through the clock buffer 14 generates an oversampling clock signal whose frequency is N times that of the reference clock (in this case, N is a positive integer), based on the reference clock signal, and inputs the oversampling clock signal to the sampler 12. In this case, it is preferable that the integer N is at least three. That is, the oversampling clock frequency is at least three times the reference clock frequency. The data sampler 12 performs the oversampling of the received serial data based on the oversampling clock, and transmits a sampling result value to the position detector 13. The algorithm of the present invention is performed in the position detector 13. The position detector 13 compares the sampled values in accordance with the above-described algorithm. For example, $Out(L_n)$ and $Out(R_n)$ are compared to determine to whether they are identical or not. Thereafter, the transition position of data is detected based on the result and a sampling value determined as an effective value is output. In this case, by successively outputting the data onto a plurality of data buses in accordance with the number of original data bits according to an embodiment of the present invention, the values output from the position detector 13 can be constructed to be not serial data but parallel data.

Meanwhile, using the algorithm of the present invention, it is possible to determine whether the data leads (i.e., data arrives faster than reference time) or lags (i.e., data is delayed). When the lead/lag of the data is determined using the algorithm of the present invention, the case where $Out(L_n)!=Out(R_n)$ is generally used. The above case is described in detail below.

First, it is determined that $Out(L_n)$ is an effective output if $Out(L_n)!=Out(R_n)$ is satisfied and the transition of the data exists only between the clocks $R_n$ and $M_{n+1}$. In this case, the data is in a data lag state. For example, in FIG. 6 showing the data lag state, if it is assumed that $D_{n-1}=1$, $D_n=0$, and $D_{n+1}=1$, $(Out(L_n)=1)!=(Out(R_n)=0)$ is satisfied and the transition of the data exists only between the clocks $R_n$ and $M_{n+1}$, so that it is determined that $Out(R_n)$ is an effective output. Accordingly, it can be understood that the data is in the data lag state.

Figure 7A:
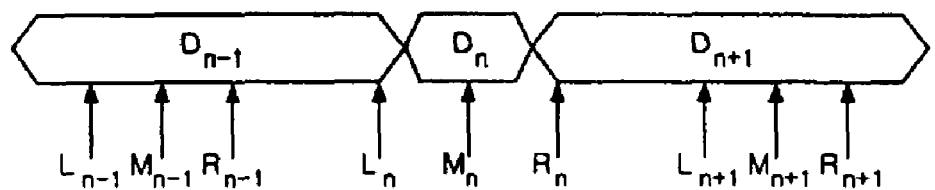
Figure 7B:
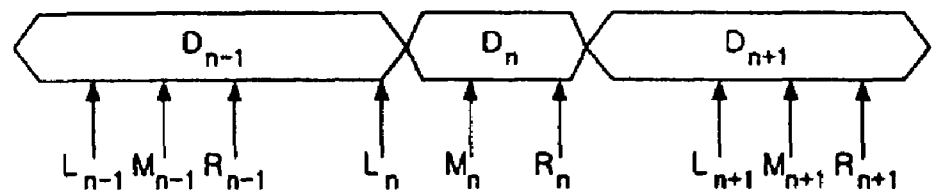
Figure 7C:
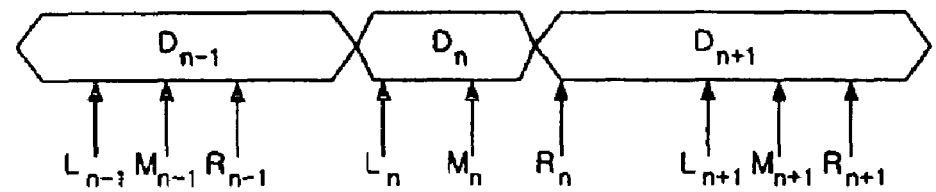
Figure 7D:
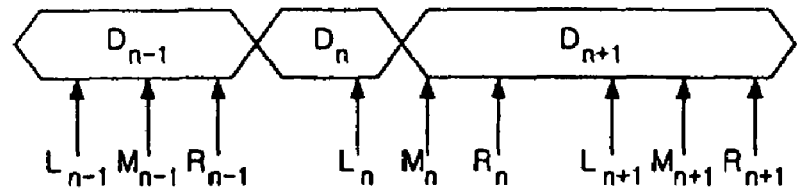

Thereafter, if $Out(L_n)!=Out(R_n)$ is satisfied and the transition of the data exists only between the clocks $L_n$ and $M_{n-1}$, it is determined that $Out(L_n)$ is an effective output. In this case, the data is in a data lead state. For example, in FIG. 7d showing the case of the data lead state, if it is assumed that $D_{n-1}=1$, $D_n=0$ and $D_{n+1}=1$, $(Out(L_n)=0)!=(Out(R_n)=1$ is satisfied and the transition of the data exists only between the clocks $L_n$ and $M_{n-1}$, so that it is determined that $Out(L_n)$ is an effective output. Accordingly, it can be understood that the data is in the data lead state.

Last, the case where $Out(L_n)!=Out(R_n)$ is satisfied and there is no transition of the data between the clocks $R_n$ and $M_{n+1}$, and between the clocks $L_n$ and $M_{n-1}$ is described below. According to the algorithm of the present invention, it is already described that in the above case, it is determined that $Out(M_n)$ is an effective output. Accordingly, the case requires one more process to determine whether the data is in the lead or lag state. That is, a clock whose output value identical with that of $Out(M_n)$ is sampled is detected. If the clock is $R_n$, the data is in the data lag state. If, as a result of the detection, the clock is $L_n$, the data is in the data lead state. For example, in FIG. 7b showing the case of the data lag state, if it is assumed that $D_{n-1}=0$, $D_n=1$ and $D_{n+1}=1$, $(Out(L_n)=0)!=(Out(R_n)=1)$ is satisfied and there is no transition of the data between the clocks $L_n$ and $M_{n-1}$, and between the clocks $R_n$ and $M_n=1$, so that it is determined that $Out(M_n)$ is an effective output. In this case, $Out(L_n)=Out(R_n)$ is satisfied, so that it can be understood that the data is in the data lag state. Furthermore, in FIG. 7c showing the case of the data lead state, if it is assumed that $D_{n-1}=0$, $D_n=1$ and $D_{n+1}=1$, $(Out(L_n)=0)!=(Out(R_n)=1)$ is satisfied and there is no transition of the data between the clocks $L_n$ and $M_{n-1}$, and between the clock $R_n$ and $M_{n+1}$, so that it is determined that $Out(M_n)$ is an effective output. In this case, $Out(L_n)=Out(R_n)$ is satisfied, so that it can be understood that the data is in the data lead state.

Such a data lead/lag determination algorithm and a circuit are applied and used to generate a feedback signal for synchronizing a signal in various ways. Furthermore, the position detector 13 of the serial data receiver 10 of the present invention can be constructed to output an effective value and simultaneously output a data lead or lag signal.

The characteristics of the present invention have been described in detail above. According to the present invention as described above, the accurate recovery of all data patterns transformed not to deviate from the sampling limitation of a minimum clock $L_n$ and a maximum clock $R_n$ can be implemented. The algorithm of the present invention can be simply applied to all serial link receiving circuits. Accordingly, the present invention is advantageous in that a more accurate, higher performance serial link receiver can be inexpensively provided. Furthermore, by applying the algorithm of the present invention, it is possible to simply determine whether the data is in a lead or lag state.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A serial data receiver comprising:
   an input buffer for receiving and storing a serial data signal output from a transmitting end;
   a clock buffer for receiving and storing a reference clock signal output from the transmitting end;
   a clock generator for generating a plurality of overclock signals based on the reference clock signal;
   a data sampler for oversampling the received serial data based on the plurality of overclock signals; and
   a position detector for comparing values sampled by the respective overclock signals and outputting the most effective value as a data value that corresponds to the reference clock signal while considering a transition position of a data bit, wherein the position detector is performed in such a way that:

in the case where values output from right and left overclocks of a current reference clock are identical with each other, an output value of the left or right overclock is output as an effective value if there is transition of the data bit between the left overclock and a previous reference clock, or between the right overclock and a next reference clock, and an output value of the current reference clock is output as an effective data value if there is no transition therebetween; and in the case where the values output from the right and left overclocks of the current reference clock are not identical with each other, an output value of the left overclock is output as an effective data value if there is transition of the data bit only between the left overclock and the left reference clock, an output value of the right overclock is output as an effective value if there is transition of the data bit only between the right overclock and the next reference clock, and the output value of the current reference clock is output as an effective value if there is no transition of the data bit.

2. The serial data receiver as set forth in claim 1, further comprising a data lead/lag determination circuit for comparing the values sampled by the respective overclock signals and determining whether the data is in a lead or lag state while considering the transition position of the data bit.

3. The serial data receiver as set forth in claim 2, wherein the data lead/lag determination circuit is performed in such a way that, in the case where the values output from the right and left overclocks of the current reference clock are not identical with each other, a data lead signal is output if there is transition of the data bit only between the left overclock and the previous reference clock, a data lag signal is output if there is transition of the data bit only between the right overclock and the next reference clock, the data lead signal is output if there is no transition of the data bit and a clock whose value identical with the output value of the current reference clock is sampled is the left overclock, and the data lag signal is output if there is no transition of the data bit and a clock whose value identical with the output value of the current reference clock is sampled is the right overclock.

* * * * *